June 14, 1966  L. E. BOHL ETAL  3,256,352
HEAT TRANSFER IN OXYCHLORINATION REACTIONS
Filed June 6, 1962
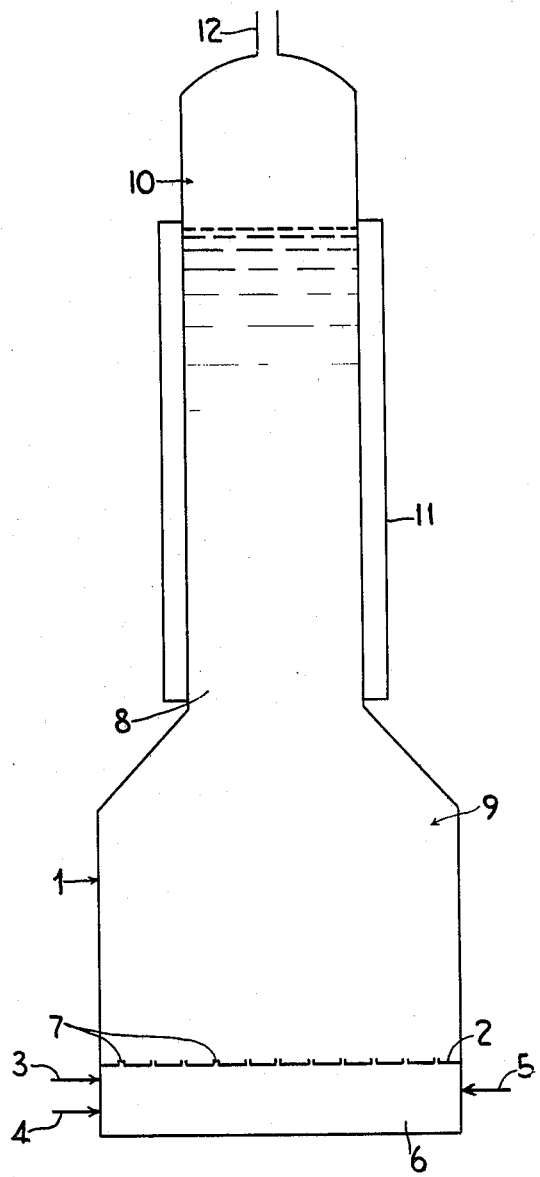
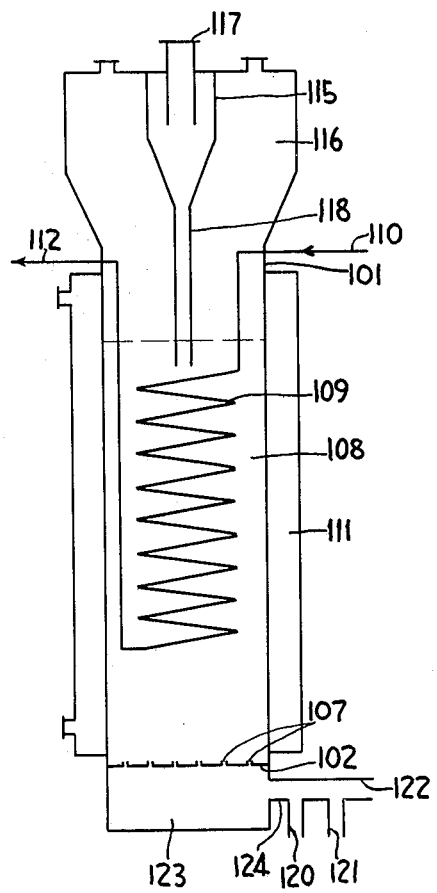
INVENTORS
LESTER E. BOHL and
RAYMOND M. VANCAMP
BY
Oscar L. Spencer
ATTORNEY United States Patent Office 3,256,352
Patented June 14, 1966

3,256,352
HEAT TRANSFER IN OXYCHLORINATION REACTIONS
Lester E. Bohl and Raymond M. Vancamp, New Martinsville, W. Va., assignors to Pittsburgh Plate Glass Company, Pittsburgh, Pa., a corporation of Pennsylvania
Filed June 6, 1962, Ser. No. 200,450
3 Claims. (Cl. 260—654)

This application is a continuation-in-part of our application U.S. Serial No. 28,520, filed May 12, 1960, now abandoned.

The present invention relates to the oxychlorination of hydrocarbons and/or chlorohydrocarbons. More particularly, the present invention relates to improvements in the operation of fluid bed reactors in which oxychlorination procedures are being conducted.

The term "oxychlorination" utilized herein in the specification and claims refers to metal halide catalyzed processes in which gaseous hydrogen chloride is utilized as a chlorinating agent. These processes involve chlorination of hydrocarbon or chlorohydrocarbon with hydrogen chloride and an oxygen containing gas such as air or elemental oxygen. The process takes place conveniently in the presence of a metal halide catalyst such as cupric chloride impregnated on a suitable carrier. It has been postulated that in these oxychlorinations the hydrogen chloride is oxidized to chlorine and water and the chlorine reacts with the organic material present in the feed gas.

In one modification of an oxychlorination reaction, elemental chlorine is used as the feed source of chlorine. In this latter processes, hydrogen chloride is generated by the chlorination with the elemental chlorine of the hydrocarbon and/or chlorohydrocarbon feed. Thus, free chlorine, oxygen containing gas and a hydrocarbon and/or chlorohydrocarbon to be chlorinated are passed in contact with a metal halide catalyst bed. The chlorine reacts with the hydrocarbon or chlorohydrocarbon to produce hydrogen chloride and a chlorinated product of the hydrocarbon or a more chlorinated derivative of the chlorohydrocarbon. The chlorine content of the hydrogen chloride produced in this manner is then utilized to achieve additional chlorinations of the hydrocarbon and/or chlorohydrocarbons present in the reaction zone by virtue of a catalytic oxidation of the hydrogen chloride to elemental chlorine and water.

The term "fluidized bed" as utilized herein in the specification and claims refers to processes in which a gas is passed through a bed of solid material wherein several different conditions may be established depending upon the gas velocity, size of the particles, etc. Thus, if gas velocities are too low, the bed of solids remains practically static; the gas simply passes through the bed pores and nothing happens to the particles contained within the bed. On the other hand, as the gas velocity is increased at least some of the particles become dynamically suspended in the upwardly rising gas stream. As a result, the bed height expands. Such beds are termed "dynamic beds." If the gas velocity is still further increased, the particles all become suspended and the bed expands even further. Ultimately, the bed may assume a highly turbulent condition which in many ways resembles a boiling liquid.

The present process is specifically designed for conducting reactions in catalyst beds with gas velocities that provide for dynamic and fluidized beds. The exact condition requisite to establishing such bed conditions depends upon such factors as the particle size and distribution of sizes of the bed particles, the components, the gas velocity, the density of the particles and other like considerations. Wilhelm and Kwauk, "Chemical Engineering Progress," volume 44, page 201 (1948), equate the various factors necessary for fluidizing a bed and by following the principles therein discussed the desired bed conditions may be provided for. In the preferred mode of operating the instant process, a fluidized bed rather than the dynamic bed is employed.

In operating fluidized bed reactors, it has been found quite frequently that utilization of the hydrocarbon and/or chlorohydrocarbon and the chlorinating agent employed quite frequently fall short of desirable conversion rates. In addition, it has been found that considerable quantities of the hydrocarbon material employed are frequently burned during the oxychlorination reaction. Since the burning of the hydrocarbon feed material represents also decreased utilization, operations involving low utilization of feed materials and excessive burning are not particularly attractive. In accordance with the teachings of the present invention, many of the difficulties encountered by the prior art in operating fluidized bed reactors in which oxychlorination reactions are conducted have been eliminated or substantially minimized.

Thus, in accordance with the present invention, a process is provided in which oxychlorination reactions are conducted in a fluidized bed in which substantially all of the oxychlorination reaction itself is conducted in the first portion of the fluidized bed which comes in contact with the reactant gases. Since typically fluid beds are operated in a vertical position, the reaction takes place in the lower portion of the bed, typically in the lower 2 to 20 percent of the bed height. The reaction being substantially completed in the lower 2 to 20 percent of the fluidized reaction bed contained in a reactor, the upper portion of the fluidized bed, i.e., the upper 80 to 98 percent, typically the upper 65 percent of the remaining bed height, is employed to cool catalyst particles which have been heated by the exothermic heat of the reactions involved in conducting the oxychlorination reaction.

Thus, in accordance with the present invention by the proper selection of conditions, such as catalyst particle size and density, bed height, fluidizing velocities and other similar considerations, the major portion of the oxychlorination reaction is caused to take place in the lower portion of the fluidized bed, while the remaining upper portion of the fluidized bed is operated under conditions designed to cool particles heated by the exothermic reaction taking place in the lower portion of the fluidized beds. Operations in this manner provide excellent conversion of feed material during the oxychlorination of hydrocarbons and/or chlorohydrocarbons.

In conducting the reactions hereinafter described to provide conditions sufficient to accomplish essentially a complete oxychlorination reaction in the lower portion of the fluidized bed employed, it is preferred that there be provided in the fluidized bed itself at least two distinct superimposed zones. The first zone is preferably operated at low gas velocities, that is, velocities not greater than 100 percent above the minimum fluidizing velocity for the size and character of the particles contained in the bed and for the size of the bed employed. The second of these zones operates at a fluidizing velocity typically 150 to 500 percent greater than the minimum fluidizing velocity for size and character of the particles employed and the size of the beds utilized. To accomplish these results, it is of course to be understood that the proper correlation of the size of the particles employed and their density and the fluidizing velocities be made. This can be accomplished readily by reference to the Wilhelm and Kwalk "Chemical Engineering Progress" article hereinabove referred to. Thus, by virtue of this low fluidizing velocity in an expanded or non-restricted portion of the bed maximum reaction takes place in the lower portion of the bed. Particles are distributed as they emerge from the bottom portion 9 of the bed throughout the constricted section 8 of the bed. Heat is removed from the hot particles by the gases and particles traveling in this constricted zone at higher velocities than the lower zone where the heat generated from the chemical reaction is absorbed on the catalyst particle.

To further insure that excessive burning does not take place where high heat of reaction takes place, cooling jackets and other similar heat exchange equipment are typically employed in the area of the high velocity zone.

The catalyst employed for conducting oxychlorination reactions are generally multi-valent metal halides, particularly chlorides of metals such as copper, iron, chromium, etc. Generally, copper containing oxychlorination catalysts are preferred and a particularly effective catalyst for conducting fluidized bed reactions in which oxychlorination procedures are encountered is a copper chloride-potassium chloride catalyst material. The catalyst is placed on a suitable carrier for use in the fluid beds contemplated herein.

The selection of the particular carrier on which the catalyst will be impregnated is also variable and such materials as alumina, silica, kieselguhr, fuller's earth, etc., may be employed. A particularly effective carrier for conducting oxychlorination reactions involving fluid bed operations is "Florex" (a calcined fuller's earth manufactured by the Floridin Corporation). A Florex catalyst impregnated with equimolar proportions of copper chloride and potassium chloride forms a preferred catalyst for conducting the fluid bed operations hereinafter described.

The fluid beds employed in accordance with the teachings of this invention typically contain catalyst particles which range in size from 20 to 100 mesh. Typically, the catalyst particles are maintained in a size range such that at least 75 percent of the catalyst particles contained in the fluidized beds contemplated herein are between 240 to 600 microns in size. It has been found that operations involving larger particles contribute to much better reaction rates, higher conversions, and less burning through heat removal from a large catalyst particle is a complex problem. Thus, in accordance with the teachings of this invention advantage can be taken of the benefits of larger particles and their deterrent quality (i.e., difficult heat removal) can be readily overcome.

The particular manner in which the catalyst material is placed upon the carrier particles may be somewhat varied and generally speaking catalyst particles are impregnated by immersion of the carrier in a solution containing the catalytic components. If desired, a catalyst containing solution may be placed on the carrier particles while rotating the carrier particles in a mixing or tumbling device. If desired, a fluidized bed of catalyst carrier particles may be sprayed with catalyst solution and enough heat supplied to the bed to evaporate the water of solution.

In conducting oxychlorination reactions, various temperatures may be employed and are well known to those skilled in the art. The precise temperature conditions employed will depend upon the hydrocarbon and/or chlorohydrocarbon fed to the bed and the desired hydrocarbon chloride product. Generally speaking, fluidized beds and oxychlorination reactions are conducted at temperatures ranging from 470° F. to 1100° F. Similarly, depending upon the desired hydrocarbon chlorides and the hydrocarbon materials employed and the chlorinating materials employed, recourse to various feed conditions may be had without in any way disturbing the efficacy of the invention herein disclosed.

In providing for at least two distinct zones in the fluid bed oxychlorination reactions contemplated, ready accomplishment is achieved by providing varying velocities in two portions of the fluid beds in which the oxychlorination reaction is conducted. Thus, reactors may be designed so that a single fluidized bed is contained within reactor walls and the reactor walls so designed that the upper portion of the fluid bed is restricted in size to provide increased gas velocity in the upper portion of the fluid bed. The expanded bottom portion of the reaction zone in which the fluid bed is contained, because of the geometric design of the reactor, consequently is operated at fluidizing velocities below those obtaining in the upper portion of the zone.

For a more complete understanding of the present invention, reference is made to the accompanying drawing in which FIGURE 1 illustrates one form of a reactor configuration suitable for conducting the process of the present invention and FIGURE 2 is illustrative of another form of reactor in which the process of the present invention may be conducted.

Turning to FIGURE 1, there is shown therein a reactor 1 which is provided with a distributor plate 2 located in the bottom portion thereof. Oxygen is introduced through a line 3, chlorine, HCl or mixtures of chlorine and HCl are introduced through line 4 and a hydrocarbon and/or chlorohydrocarbon are introduced through line 5. A wind box 6 is located below the distributor plate 2 and gaseous materials introduced through these feed lines 3, 4 and 5 enter the reaction zone through holes 7 located in the distributor plate. The fluidized catalyst particles are contained in the bed 8 which operates with an expanded portion generally indicated at 9 in the drawing and a constricted portion indicated generally at 10 to provide a unitary fluidized bed. Because of the constriction in the upper portion of the bed, the fluidizing velocities in the upper portion of the bed are considerably greater than those obtaining in the lower portion of the bed. Gas feed rates to the wind box are regulated to provide a fluidizing velocity in the lower expanded portion of the bed at no greater than 100 percent of the minimum fluidizing velocity for the particles contained in the bed 9. Thus, by virtue of this low fluidizing velocity in the expanded portion of the bed maximum reaction takes place in the lower portion of the bed. Because of random motion of particles in a fluidized bed, particles are distributed as they emerge from the bottom portion 9 of the bed throughout the constricted section 8 of the bed and heat is removed from the hot particles and gases at a high rate by the gases passing through this zone at higher velocities than the lower zone. Operating in this manner it is possible to obtain the maximum productivity from a given weight or volume of catalyst.

To further insure that excessive burning does not take place cooling jacket 11 is provided in the uppermost section of the fluidized bed where maximum heat transfer rates are available because of the high particle velocity. Thus, the catalyst particles contained in portion 8 of the fluidized bed have the majority of their heat removed through the cooling jacket 11 and are then transferred from section or zone 8 to zone 9 of the fluidized bed where they again become available for more reaction. While a cooling jacket has been shown in this figure as the heat transfer surface, it is of course to be understood that recourse to other conventional heat exchange equipment may be had. Thus, bayonet coolers, hairpin coolers and other similar apparatus may be employed to remove the major portion of the exothermic heat generated in the reaction zone of the bed.

If desired, recourse to straight reactors, that is, reactors having uniform diameter dimensions from top to bottom may be employed and an auxiliary gas fed to the upper two-thirds of the fluidized bed to provide increased fluidizing velocity in the upper portion of the bed. In such an instance, cooling coils may still be located in the uppermost portion of the bed to provide for maximum heat removal at this part of the fluidized bed. The auxiliary gases are fed in the upper portion of the bed, that is, the cooling section or high velocity section so that particles containing residual heat moving from the lowermost portion of the fluidized bed to the upper portion are cooled still further in this portion of the bed before they re-enter the reaction section of the fluidized bed. If desired, these auxiliary gases may be cooled prior to introduction into the beds to insure adequate cooling of the particles therein. Any gas compatible with the system may be employed and typically inerts such as nitrogen may be employed.

In FIGURE 2, there is shown still another embodiment of the instant invention. In this figure, there is illustrated a reactor 101 having a distributor plate 102 located in the bottom thereof and provided with a plurality of drilled holes 107. The reactor bed generally indicated as 108 is enclosed by the reactor walls and the walls around the reaction zone or bed are surrounded by a cooling or heat transfer jacket 111. In the upper portion of the bed there is located a cooling coil 109 having an inlet 110 and an outlet 112. A dust collector 115 is located in the gas space 116 above the reaction bed 108 and the collector is provided with a gas outlet 117 for removal of the reaction product gases. A dip leg 118 is provided on the bottom of the dust catcher to return catalyst material to the reaction bed below the upper level of the bed. Gases are fed to the bed through lines 120, 121, and 122 and enter the wind box 123 located beneath the distributor plate through a common gas line 124.

In operation of this embodiment, gases fed to the wind box are passed through the distributor plate 102 via holes 107 at velocities sufficient to fluidize the bed of catalyst particles contained in the reactor. Since the reactor is uniform in diameter throughout the length of the fluidized bed of particles, gas velocities throughout the bed would normally be uniform. The cooling coil 109, however, because of its large surface area in the upper portion of the bed, restricts considerably the area for gas passage through the upper portion of the bed and thus serves to provide a constricted upper portion of the bed. In this manner, a high velocity zone is presented in the bed in the upper portion where the coil is located.

In conducting the process in accordance with this invention, aliphatic hydrocarbons containing from 1 to 4 carbon atoms and their incompletely chlorinated derivatives are fed in the gaseous phase along with oxygen and a chlorinating agent selected from the group consisting of HCl, $Cl_2$ and mixtures of HCl and $Cl_2$. Velocities of the gases entering the zone are maintained so that they do not exceed 100 percent of the minimum fluidizing velocity for the size of the bed and the size and density of the particles contained therein. The bed is fluidized in a specially designed reaction zone so that no more than the lower one-third of the bed height is contained in an expanded reaction space. The upper portion of the reactor is constricted to the extent that the fluidizing gases passing from the expanded section of the reaction zone and entering the constricted area above the expanded section reach fluidizing velocities which are 150 to 500 percent greater than the minimum fluidizing velocity for the size of the particles, size of the bed, and the density of the particles employed when the velocity to the expanded section is controlled to provide a fluidizing velocity not greater than 100 percent of the minimum fluidizing velocity. Operation in this manner, aliphatic hydrocarbons and their incompletely chlorinated derivatives subjected to oxychlorination reactions in a fluid bed achieve high degrees of utilization with little or no burning.

The process of the present invention includes oxychlorination of aliphatic hydrocarbons having from 1 to 4 carbon atoms and their incompletely chlorinated derivatives. The incompletely chlorinated derivative may comprise chlorine addition and substitution products of aliphatics having 1 to 4 carbon atoms. Preferably, compounds fed to the system are chlorinatable aliphatic compounds having the formula:

$$C_nH_mX_r$$

where X represents chlorine, $n$ is an integer from 1 to 4, $m$ is an integer of at least 1 and the sum of $m+r$ is $2n+2$, $2n$ or $2n-2$. Generally, the feed comprises compounds in which the sum of $m+r$ is $2n+2$. When considerable recycle of products is performed, compounds in which the sum of $m+r$ is $2n$ and $2n-2$ are encountered as feed.

Products formed by the reactions occurring in the present invention are numerous and varied, and depend upon the particular hydrocarbon feed employed. Thus, when butane or propane are employed more products are formed than when ethane or methane are used as feed. Saturated and unsaturated compounds are produced. Thus, when butane is used as the hydrocarbon feed, for example, methyl chloride, methylene chloride, chloroform, carbon tetrachloride, butyl chloride, dichlorobutane, ethyl chloride, propyl chloride, ethane, ethylene, propane, propylene, methane and the like are produced. When propane, ethane or methane are employed, the variety of products decreases as the number of carbon atoms contained in the hydrocarbon feed gas decreases.

Product recovery from systems conducted in accordance with this invention may be accomplished for example by indirect or direct condensation, carbon absorption trains, Dry Ice cold traps, and fractional distillation procedures or combinations of these procedures to separate the multitude of products present in product gases emanating from these processes. Generally speaking, the higher the carbon content of the hydrocarbon feed employed, the more numerous the products formed and consequently the more intricate the recovery system necessary to separate product gases into their components.

For a more complete understanding of the present invention, reference is made to the following examples which are illustrative of certain methods which may be employed to conduct the reaction in accordance with the teachings of this invention.

*Example I*

Florex, a calcined diatomaceous earth manufactured by the Floridin Corporation and ranging in particle size between 60 to 100 mesh is utilized as the catalyst carrier material. Four hundred grams of the 60 to 100 mesh Florex is placed in a rototumbler, the device is actuated and the contents heated to a temperature of 140° C. A stock solution is prepared by dissolving 440 grams of copper chloride ($CuCl_2 \cdot 2H_2O$) and 186 grams of potassium chloride (HCl) in 1000 cc. of water. Five hundred eighty-six grams of the stock solution of copper chloride-potassium chloride is diluted to 1533 cc. volume with distilled water and this diluted solution is utilized as the catalyst carrying material. This diluted solution is added to the Florex in the rototumbler in dropwise fashion and the rotortumbler is continuously heated during the addition. When the solution was completely added, the impregnated Florex was dried in the rotortumbler by rotating it for 30 additional minutes while heating the contents to a temperature of 140° C. Based on the total weight of the carrier, the finished catalyst contains 10 percent by weight copper on an anhydrous basis.

*Example II*

A nickel reactor 8 feet in height and 15 inches in diameter is employed as a fluid bed reactor. The reactor is enclosed in a 20-inch diameter steel jacket forming an annular heat exchange system and Dowtherm (a diphenyl-diphenyl oxide eutectic), is used to heat or cool the fluid bed. An 8″ diameter nickel internal cyclone is located at the top of the reactor in a 20-inch diameter x 18 inches high expanded section. Located in the bottom of the reactor is a nickel distributor plate having a plurality of drilled holes therein. Below the distributor plate is a chamber or wind box closed at the sides and bottom and serving as an introduction chamber for the reactant feed gases. Gases introduced into the reactor pass from the chamber through the drilled holes of the distributor plate to the reactor proper.

The reactor is filled to a depth of 6 feet with catalyst particles prepared as described in Example I. Three gas feed lines are provided for the introduction of oxygen, hydrocarbons and/or hydrocarbon chlorides, and a chlorinating agent into the reactor wind box. A cooling coil consisting of 36 feet of ½ inch nickel pipe is located in the upper portion of the fluid bed and water under pressure of 30 pounds per square inch is circulated through the coil to remove a portion of the heat generated from the reaction taking place on the fluid catalyst.

Using this apparatus, ethylene dichloride, HCl and oxygen are fed to the wind box of the reactor in a molar ratio of 1.0 to 1.1 to 1.2. The superficial linear velocity of the gases entering the reaction chamber is about 0.5 foot per second. Gases in the upper or cooling portion of the reaction chamber have a superficial velocity of about 0.7 foot per second. The temperature of the reaction zone is maintained between 750° F. and 850° F. and perchloroethylene and trichloroethylene are produced. The utilization of the hydrocarbon to chlorinated organics is 85 percent and a halide utilization of 90 percent is obtained. Burning of feed material is typically below 12 percent.

*Example III*

Utilizing the catalyst of Example I and the apparatus of Example II ethylene, HCl and oxygen are reacted in a fluidized bed reaction zone operated at a temperature of 550° F. The molar feed ratio of ethylene to HCl to $O_2$ is maintained at 1.0 to 2.0 to 0.58. The superficial linear velocity of the feed gases in the lower section of the reactor is maintained at 0.4 foot per second while the linear velocity of the gases in the constricted portion of the reactor is 0.56 foot per second. 1,2-dichloroethane is produced in yields of 95 percent or more and the utilization of ethylene is about 90 percent.

*Example IV*

Utilizing the catalyst of Example I and the reactor system of Example II, 1,2-dichloroethane, chlorine and oxygen are fed to the reactor and reacted in a fluidized bed of the catalyst. The temperature of the reactor is maintained at 810° F. The molar feed ratio of 1,2-dichloroethane to chlorine to oxygen is maintained at 1 to 0.60 to 1.05. The superficial linear velocity of gases entering the fluidized bed is regulated at 0.3 foot per second. The superficial linear velocity of gases in the constricted portion of the reactor is 0.42 foot per second. Under these conditions, perchloroethylene and trichloroethylene are produced in good yields with a utilization of 1,2-dichloroethane to product of about 75 percent.

*Example V*

Utilizing the catalyst of Example I and the apparatus system of Example II, 1,2-dichloroethane, HCl, chlorine and oxygen are reacted in a fluidized bed reaction zone operated at a temperature of 790° F. The molar feed ratio of 1,2-dichloroethane to HCl to chlorine to oxygen is maintained at 1 to 0.6 to 0.3 to 1.15. The superficial linear velocity of the feed gases entering the lower part of the reactor is maintained at 0.45 foot per second while the linear velocity of the gases in the constricted portion of the reactor is 0.63 foot per second. Perchloroethylene and trichloroethylene in good yields are obtained operating under these conditions and the utilization of the organic feed is high.

*Example VI*

Utilizing the catalyst of Example I and the reactor 1 of FIGURE 1, ethylene, HCl and oxygen are fed to the wind box 6 of the reactor via lines 3, 4 and 5 respectively. Gases entering the expanded reaction zone 9 are at a superficial linear velocity of about 0.4 foot per second. Gases passing through the upper constricted portion 8 of the bed are at a superficial linear velocity of about 0.56 foot per second. The temperature of the reactor is maintained at 550° F. by circulating Dowtherm (a diphenyl-diphenyl oxide eutectic) in the jacket 11. Operating in this manner, high yield of hydrocarbon halide, notably 1,2-dichloroethane, is obtained and burning of the hydrocarbon is typically below 12 percent.

While the invention has been described by reference to certain specific embodiments, it is of course to be understood that it is not intended that it be limited thereby except insofar as appears in the accompanying claims.

We claim:

1. In a process for the chlorination of aliphatic hydrocarbons containing from 1 to 4 carbon atoms and their incompletely chlorinated derivatives in the gaseous phase which comprises reacting the material to be chlorinated, an oxygen-containing gas and a chlorinating agent selected from the group consisting of HCl and $Cl_2$ and mixtures of HCl and $Cl_2$ in a metal halide fluidized bed catalytic reaction zone, the improvement comprising maintaining in the fluidized bed two distinct zones, the first of said zones being operated at gas velocities not more than 100 percent greater than the minimum fluidizing velocity for the particles contained in the fluidized bed while operating the second portion of said zone at a fluidizing velocity of 150 to 500 percent greater than the minimum fluidizing velocity and removing heat from said second portion of said zone.

2. The method of claim 1 wherein the catalyst particles contained in the fluidized bed are maintained so that at least 75 percent of the particles are between 240 to 600 microns in size.

3. The method of claim 1 wherein the major portion of the heat transferred from the exothermic oxychlorination reaction is removed from the second of said zones.

References Cited by the Examiner

UNITED STATES PATENTS

| | | | |
|---|---|---|---|
| 2,444,990 | 7/1948 | Hemminger | 252—417 X |
| 2,446,426 | 8/1948 | Layng | 260—449.6 |
| 2,644,846 | 7/1953 | Johnson et al. | 260—659 |
| 2,783,286 | 2/1957 | Reynolds | 260—659 X |

OTHER REFERENCES

Zenz et al.: Fluidization and Fluid Particle Systems (Reinhold, 1960, page 440).

LEON ZITVER, *Primary Examiner.*